United States Patent

Ng et al.

Patent Number: 5,586,055
Date of Patent: Dec. 17, 1996

[54] NON-UNIFORMITY CORRECTION OF AN LED PRINTHEAD

[75] Inventors: Yee S. Ng, Fairport, N.Y.; Hur-Jye Yeh, Westlake Village, Calif.

[73] Assignee: Eastman Kodak Company, Rochester, N.Y.

[21] Appl. No.: 310,112

[22] Filed: Sep. 20, 1994

[51] Int. Cl.$^6$ .............................. G01D 15/14; H04N 1/23
[52] U.S. Cl. .............. 364/526; 364/571.01; 364/571.06; 364/571.07; 346/107.1; 346/107.6; 358/298
[58] Field of Search .............................. 346/107 R, 160, 346/154, 157; 358/298; 364/526, 571.01, 571.07

[56] References Cited

U.S. PATENT DOCUMENTS

| | | | |
|---|---|---|---|
| 4,746,941 | 5/1988 | Pham et al. | 364/519 |
| 4,831,395 | 5/1989 | Pham et al. | 346/160 |
| 4,885,597 | 12/1989 | Tschang et al. | 364/519 |
| 5,200,765 | 4/1993 | Tai | 346/107 R |
| 5,255,013 | 10/1993 | Ng et al. | 346/107 R |
| 5,257,039 | 10/1993 | Chung et al. | 346/107 R |

FOREIGN PATENT DOCUMENTS

WO91/10311  7/1991  WIPO.

OTHER PUBLICATIONS

US Patent application 08/175,079, Ajewole.
US Patent application 07/807,522, Kelly.

*Primary Examiner*—Emanuel T. Voeltz
*Assistant Examiner*—Kamini S. Shah
*Attorney, Agent, or Firm*—Norman Rushefsky

[57] ABSTRACT

A method for calibrating a printer that includes an LED printhead wherein the LEDs are arranged in a row in a series of arrays wherein each array includes a plurality of LEDs generally uniformly spaced a nominal pitch distance on the array in the direction of the row. The arrays have respective array end LEDs which have spacing from adjacent array end LEDs on adjacent arrays that are different than the nominal pitch distance. The method comprises the steps of (a) measuring a parametric output associated with light-emissions from each recording element; (b) assigning correction factors to the recording elements to correct for non-uniformity of light emissions therefrom with recording elements having generally similar measured parametric outputs being assigned identical correction factors; (c) assigning correction factors to array end recording elements, that are spaced other than the nominal pitch distance, in accordance with parameters relating to their spacing from a respective adjacent array end recording element and their measured parametric outputs; and (d) storing the correction factors in a memory associated with the printhead.

9 Claims, 5 Drawing Sheets

NON-UNIFORMITY CORRECTION OF AN LED PRINTHEAD

BACKGROUND OF THE INVENTION

1. Field of the Invention

The present invention relates to a method of calibrating LED writers and more particularly to a method for correcting for non-uniformity errors associated with such writers and particularly to the correction of errors arising from incorrect spacing of LEDs relative to each other on a printhead.

2. Description Relative to the Prior Art

With reference to PCT publication No. WO 91/10311, the pertinent contents of which are incorporated herein by reference, in an LED (light-emitting diode) based grey scale electrophotographic printing system, exposure is usually controlled by the length of time each LED is turned on with the emitted light intensity held constant. The LED on-time varies imagewise and the resulting exposure is given by the product of this time and the intensity. The printhead itself is comprised of several thousand individual LEDs and, because of variation in LED response, the light intensity varies from LED to LED within the same printhead for the same amount of energizing current. This results in a non-uniform exposure of an otherwise uniform field.

For each level of gray the number of exposure times that can be requested is potentially equal to the number of LEDs in the printhead. Thus, for a j-bit gray level system that uses an LED printhead with N LEDs as the writer, the number of possible exposure times that can be requested is N $(2^j-1)$, excluding the null exposure level (white). For N=4000 (typical) and j=4, this number is 60,000. There is no economical printhead architecture that is capable of generating nearly as many exposure times as this. The number of exposure times that a typical LED printhead can generate is determined by its controller circuit. For a printhead with a k-bit controller (say for example k=6), the total number of exposure times that can be generated is $2^k$, with j<k but significantly less than N $(2^j-1)$. It is the goal of a non-uniformity correction algorithm to use the total number of exposures that can be requested to generate an optimum look-up table (LUT).

In a preferred look-up table approach to providing non-uniformity correction described in U.S. Pat. No. 5,255,013, the LUT is realized by two look-up table memories. A first LUT memory represents the grading of the approximately 4,000 or more LEDs into 256 categories according to their respective brightness levels. As is known, even though the same current be driven through each LED, LEDs respond differently and their light outputs vary. Some may be brighter than others with the very brightest being assigned category 255 and the least brightest being assigned category 0.

The first LUT memory provides reasonable approximation for correction. In theory the desired grey level of exposure $C_j$, for grey level "j" should be in accordance with the following equation $B_i \times T_{ij} = C_j$ where $B_i$ is the brightness of a particular LED "i" and $T_{ij}$ is the required exposure time for an LED of brightness $B_i$ to form an exposure $C_j$. The grey levels $C_j$ may be noted empirically by sensing the brightness of each LED and identifying the time period $T_{ij}$ required to record each of the various grey levels. The LEDs can then be grouped into appropriate categories or bins of brightness and a second look-up table memory created to approximate the print duration by assigning say a 6-bit corrected printing data signal for each grey level for each of the particular categories of brightness to which LEDs have been assigned.

While this approach is generally satisfactory, a problem still exists with regard to nonuniformity errors from LEDs at the ends of arrays. Typically, in the manufacture of printheads, the about 4000 or more LEDs are fabricated in arrays of say 64, 128 or 196 LEDs to an array. Arrays are then assembled end to end upon a printhead to make up the number of LEDs required. While LEDs are uniformly spaced or pitched on each array because of the accuracy of the photolithographic fabrication process, the spacing between LEDs at the ends of butting arrays do not generally possess this uniformity of pitch. Heretofore, the approach of the prior art is to adjust spacing as best as possible and/or otherwise make do with the error that improper spacing imposes.

It is, therefore, an object of the invention to improve upon the exposure non-uniformities created by improperly spaced end LEDs which thereby has the advantage of either increasing uniformity and/or permitting looser tolerance in butt spacing of end LEDs on arrays.

SUMMARY OF THE INVENTION

These and other objects of the invention will become more apparent from the reading hereof are realized in a method for calibrating a printer having a printhead that includes a plurality of light-emitting recording elements arranged in a row in a series of arrays wherein each array includes a plurality of recording elements generally uniformly spaced a nominal pitch distance on the array in the direction of the row, the arrays having respective array end recording elements in which the array end recording elements of at least some of the arrays have spacings from adjacent array end recording elements on adjacent arrays that are different than the nominal pitch distance, the method comprising the steps of (a) measuring a parametric output associated with light-emissions from each recording element; (b) assigning correction factors to the recording elements to correct for non-uniformity of light emissions therefrom with recording elements having generally similar measured parametric outputs being assigned identical correction factors; (c) assigning correction factors to array end recording elements, that are spaced other than the nominal pitch distance, in accordance with parameters relating to their spacing from a respective adjacent array end recording element and their measured parametric outputs; and (d) storing the correction factors in a memory associated with the printhead.

BRIEF DESCRIPTION OF THE DRAWINGS

In the description of the preferred embodiments provided below reference will be made to the accompanying drawings where.

DETAILED DESCRIPTION OF THE PREFERRED EMBODIMENTS

The apparatus of the preferred embodiment will be described in accordance with an electrophotographic recording medium employing LEDs as an exposure source. The invention, however, is not limited to apparatus for creating images on such a medium or with such exposure devices as other media such as photographic film, etc. may also be used with the invention as well as other devices for providing image creation in accordance with the teachings of the invention.

Because electrophotographic reproduction apparatus are well known, the present description will be directed in particular to elements forming part of or cooperating more directly with the present invention. Apparatus not specifically shown or described herein are selectable from those known in the prior art.

Figure 1:
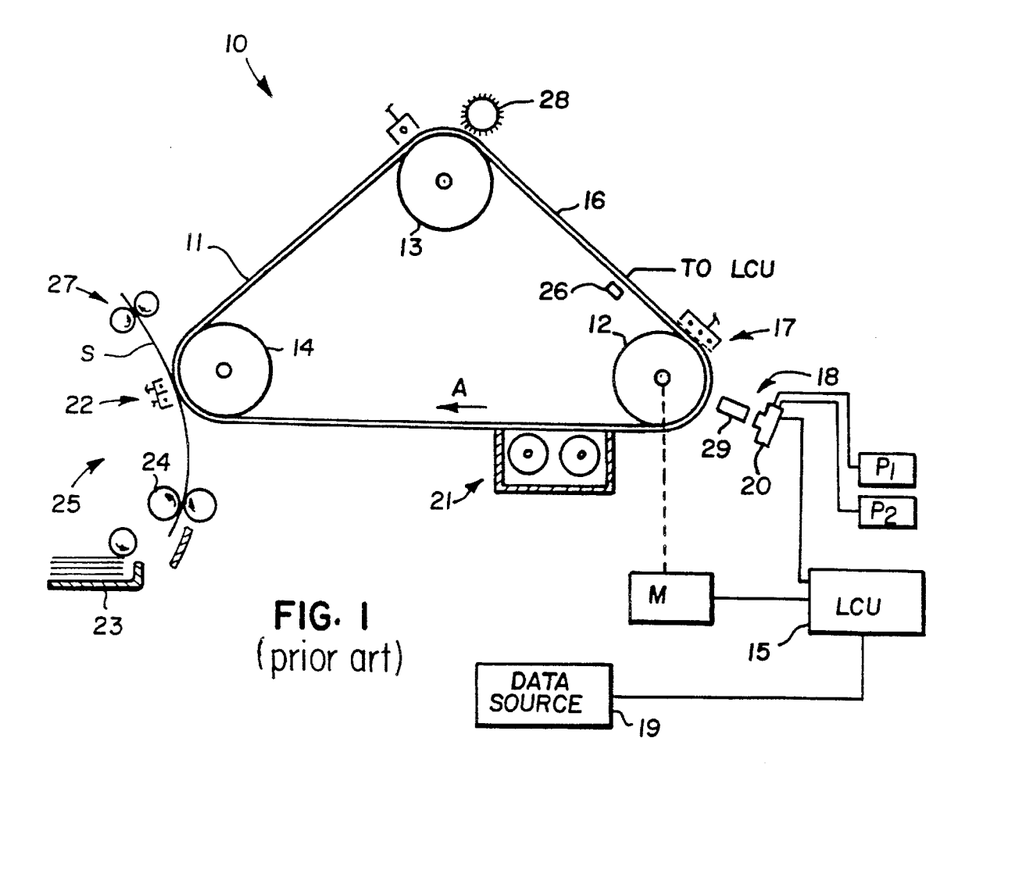
FIG. 1 is a side elevational view in schematic form of a prior art electrophotographic apparatus wherein an LED printhead calibrated in accordance with the method of the invention may be used.

With reference to FIG. 1, an electrophotographic reproduction apparatus 10 includes a recording medium such as a photoconductive web 11 or other radiation-sensitive medium that is trained about three transport rollers 12, 13 and 14, thereby forming an endless or continuous web. Roller 12 is coupled to a drive motor M in a conventional manner. Motor M is connected to a source of potential when a switch (not shown) is closed by a logic and control unit (LCU) 15. When the switch is closed, the roller 12 is driven by the motor M and moves the web 11 in a clockwise direction as indicated by arrow A. This movement causes successive image area of the web 11 to sequentially pass a series of electrophotographic work stations of the reproduction apparatus. These stations will be briefly described.

First, a charging station 17 is provided at which the photoconductive surface 16 of the web 11 is sensitized by applying to such surface a uniform electrostatic primary charge of a predetermined voltage. The output of the charger may be controlled by a grid connected to a programmable power supply (not shown). The supply is in turn controlled by the LCU 15 to adjust the voltage level Vo applied onto the surface 16 by the charger 17.

At an exposure station 18 an electrostatic image is formed by modulating the primary charge on an image area of the surface 16 with selective energization of point-like radiation sources in accordance with signals provided by a data source 19. The point-like radiation sources are supported in a printhead 20 to be described in more detail below.

A development station 21 includes developer which may consist of iron carrier particles and electroscopic toner particles with an electrostatic charge opposite to that of the latent electrostatic image. Developer is brushed over the photoconductive surface 16 of the web 11 and toner particles adhere to the latent electrostatic image to form a visible toner particle transferable image. The development station may be of the magnetic brush type with one or two rollers. Alternatively, the toner particles may have a charge of the same polarity as that of the latent electrostatic image and develop the image in accordance with known reversal development techniques.

The apparatus 10 also includes a transfer station 25 shown with a corona charger 22 at which the toner image on web 11 is transferred to a copy sheet S; and a cleaning station 28 at which the photoconductive surface 16 of the web 11 is cleaned of any residual toner particles remaining after the toner images have been transferred. After the transfer of the unfixed toner images to a copy sheet S, such sheet is transported on a heated pressure roller fuser 27 wherein the image is fixed to the copy sheet S.

As shown in FIG. 1, a copy sheet S is fed from a supply 23 to driver roller 24, which then urge the sheet to move forward onto the web 11 in alignment with a toner image at the transfer station 25.

To coordinate operation of the various work stations 17, 18, 21, and 25 with movement of the image areas on the web 11 past these stations, the web has a plurality on indicia such as perforations along one of its edges. The perforations generally are space equidistantly along the edges of the web 11. At a fixed location along the path of web movement, there is provided suitable means 26 for sensing web perforation. This sensing produces input signals into the LCU 15 which has a digital computer, preferably a microprocessor. The microprocessor has a stored program responsive to the input signals for sequentially actuating, then de-actuating the work stations as well as for controlling the operation of many other machine functions. Additional encoding means may be provided as known in the art for providing more precise timing signals for control of the various functions of the apparatus 10.

Programming of a number of commercial available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 2:
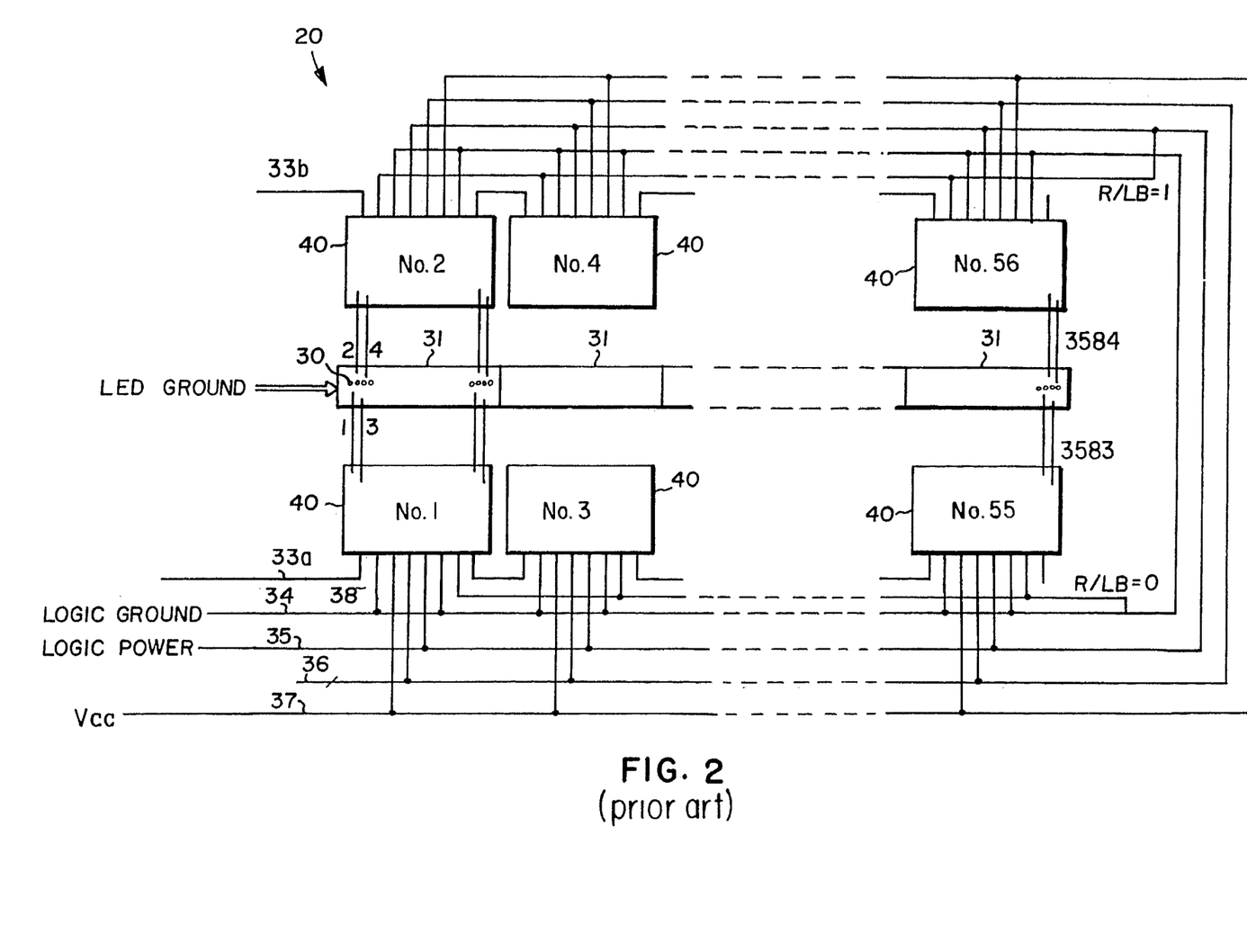
FIG. 2 is a top planar view in schematic form illustrating the arrangement of LED arrays and driver chips of an LED printhead of FIG. 1.

With reference to FIGS. 1 and 2 and to U.S. Pat. No. 4,885,597 and to U.S. Pat. No. 4,746,941, the contents of both of which are incorporated herein by this reference, the printhead 20, as noted, is provided with a multiplicity of energizable point-like radiation sources 30, preferably light-emitting diodes (LEDs). Optical means 29 may be provided for focusing light from each of the LEDs onto the photoconductive surface 16 of web or belt 11. The optical means preferably comprises an array of optical fibers such as sold under the name Selfoc, a trademark for a gradient index lens array sold by Nippon Sheet Glass, Limited. Due to the focusing power of the optical means 29, a row of emitters will be imaged on a respective line on the recording medium that is transverse to the direction of movement, indicated by arrow A, of the belt 11.

With particular reference now to FIG. 2, the printhead 20 comprises a suitable support with a series of LED chip arrays 31 mounted thereon. Each of the chip arrays 31 includes in this example 128 LEDs arranged in a single row. Chip arrays 31 are also arranged end to end in a row and where twenty-eight LED arrays are so arranged the printhead will extend across the width of the web 11 and include 3584 LEDs arranged in a single row. To each side of this row of LEDs there are provided twenty-eight identical driver chips 40. Each of these driver chips include circuitry for addressing the logic associated with each of 64 LEDs to control whether or not each of the LEDs should be energized as well as to determine the level of current to each of the LEDs controlled by that driver chip 40. Two driver chips 40 are thus associated with each chip of 128 LEDs. Each of the two driver chips will be coupled for driving of alternate LEDs. Thus, one driver chip will drive the odd-numbered LEDs of the 128 LEDs and the other will drive the even-numbered LEDs of these 128 LEDs. The driver chips 40 are electrically connected in parallel to a plurality of lines 34–37 providing various electrical control signals. These lines provide electrical energy for operating the various logic devices and current drivers in accordance with their voltage requirements. A series of lines 36 (indicated by a single line in this FIG. 2) provide data, as well as clock signals and other pulses for controlling the movement of data to the LEDs in accordance with known techniques. Lines 33a and 33b are also provided for generating a selection to enable latching of providing multibit digital data signals each representing a duration for recording a respective grey level pixel in an appropriate register. The driver chips each include a data in and data out port so that they serially pass the token signal between them.

Figure 3:
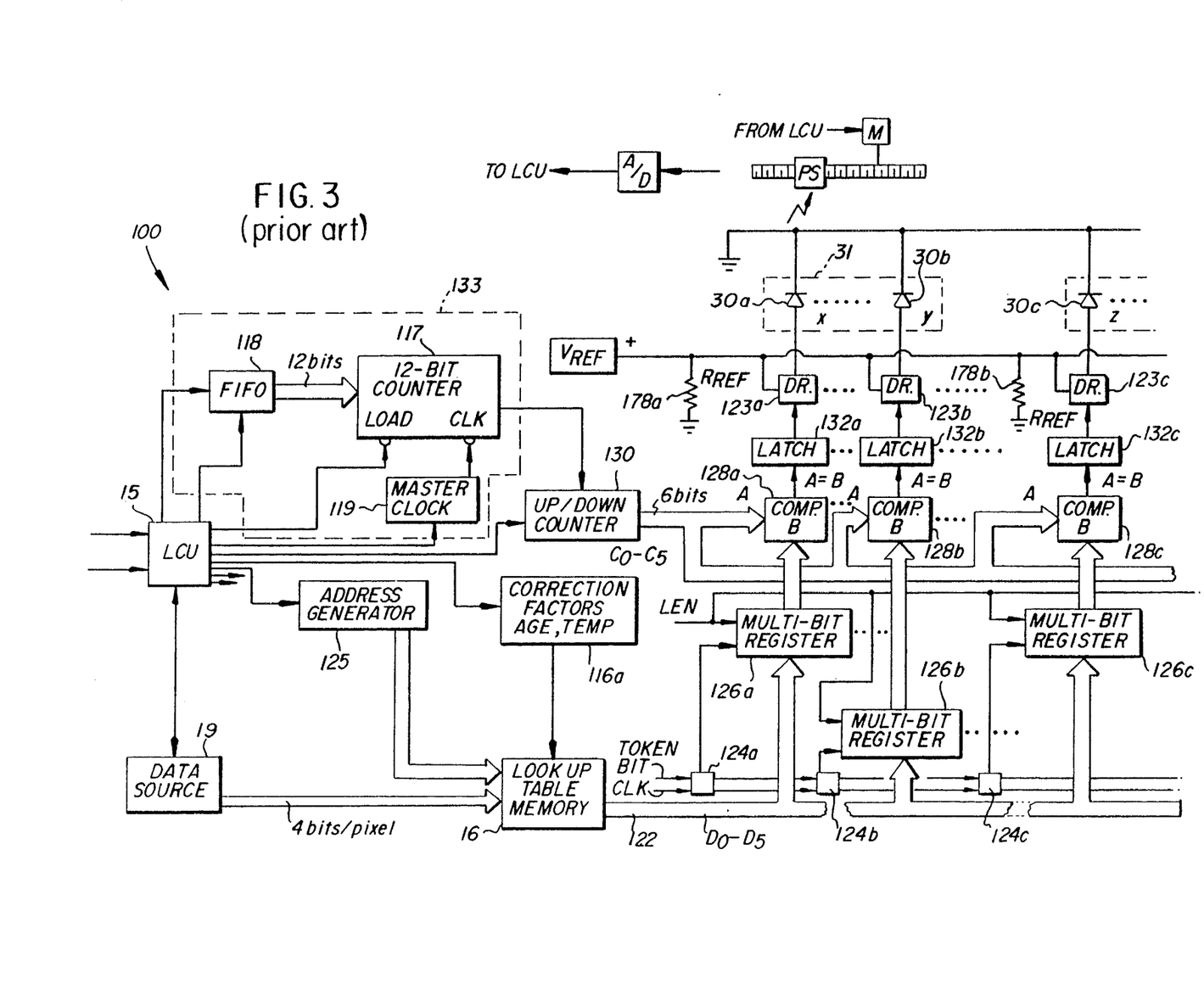
FIG. 3 is an electrical circuit in schematic form illustrating circuitry for driving LEDs on an LED printhead of FIG. 2.

With reference now to FIG. 3, the LED printhead, may be calibrated in accordance with the above described process to define values for a look-up table memory 16. As shown in FIG. 3, the linear array of several thousand triggerable LEDs are exemplified by LEDs 30a, b, c in chip arrays 31. The LEDs of the array are triggered into operation by means of image processing electronics to be described that are responsive to image signal information. Depending on the duration for which any given LED is turned on, the exposure effected by such LED is more or less made. Where the medium is, say, photographic film the latent image formed line by line by selective exposure of said LEDs may be subsequently developed by conventional means to form a visible image. Where the medium is an electrophotographic receptor, the LEDs may be used to form an electrostatic image as noted above or as known in the art on a uniformly electrostatically charged photoconductor and this image developed using colored toner particles and perhaps transferred to a copy sheet.

A circuit 100 is also shown for triggering selectively the LEDs 30 that together comprise the array. Only a few of the LEDs and its associated driver circuitry are shown for clarity purposes, it being understood that the circuitry for driving such other LEDs is similar to that described for the illustrated examples. While FIG. 3 shows all the driver circuitry associated with the LEDs located to one side of the line of LEDs, as shown in FIG. 2, it is well known to place these circuits on both sides of the line of LEDs to provide more efficient utilization of space. In this regard, integrated circuit driver chips for driving odd-numbered LEDs are located on one side of the line of LEDs and identical driver chips for driving even-numbered LEDs are located on the opposite side.

Data to be printed for each line is in the form of binary digital signals, e.g., 1's and 0's. This data on lines labeled $D_0$–$D_5$ are outputted in parallel onto the data bus 122. The data on lines $D_0$–$D_5$ comprises, in this example, a six-bits signal representing an exposure time for a particular LED for printing a single gray level recorded dot or pixel. This six-bits per pixel signal represents a corrected exposure time for recording the pixel so that the pixels recorded achieve a uniformity within certain desired parameters, in this regard reference may be had to commonly assigned U.S. application Ser. No. 08/175,079 filed in the name of Ajewole. The signals $D_0$–$D_5$ are output by a look-up table memory 116 which has at its input a 4-bits per pixel data signal from a data source 19 such as a computer or scanner or other data input source that defines a gray level for the pixel. The memory 116 may be a single memory, but is preferably split into an exposure coefficients or brightness binning table memory and an exposure time memory. Synchronously with the generation of each six-bit data signal, there is generated by, for example, a logic and control unit (LCU) 15 a token bit signal which is a single bit that is shifted down a shift register formed by a plurality of individual registers 124a, 124b, 124c, etc. Each such register is associated with a particular LED. This token bit determines which of the LEDs a particular set of data on bus 22 is intended. In operation, a series of six-bit data signals are provided on bus 122 and one six-bit signal is latched by each of the multibit registers 126a, 126b, 126c, respectively, associated with each LED. The latching being in response to the presence of the token bit in the particular respective token register 24a or 24b or 24c, etc. Further description relative to a circuit for selectively latching this data is provided in U.S. Pat. No. 4,746,941, entitled "Dot Printer With Token Bit Selection of Data Latching," the contents of which are incorporated herein by this reference. After a six-bit data signal is stored in each of the multi-bit registers, a latch enable (LEN) signal is provided by the LCU 15 to shift this six-bit signal to an output stage or latch of each register so that a six-bit level data signal (say decimal 10 for LED 30a for this particular PEL period) is output to one input terminal (B) of a respective digital comparator 128a, 128b, 128c, etc. associated with each LED. At this point in time a digital counter 130 is enabled by LCU 15 to count down, in this example, from decimal 63 ($2^6$–1) to 0. The output of the counter 130 is a six-bit signal, in this example, ($C_0$–$C_5$) representing in digital form a number or count which changes periodically in accordance with clock pulses from a programmable clock 133. With each pulse (or trailing edge of same) from clock 133, the counter changes its count at its output. The output of counter 130 is input into each of the input terminals (A) of the digital comparator. Thus, the comparators now compare the signals at their respective A and B inputs in accordance with the comparators criteria for operation, i.e., is A equal B? When the count output by the counter 130 and inputted at terminal A is equal to a respective input data signal count input at terminal B (decimal 10, for example, but can be any number between 1 and 63) the output of a respective comparator goes to a digital logic high level and is latched at a respective latch register 132a, 132b, 132c, etc. The latched signals allow drivers 123a, 123b, 123c to be enabled, at the rising edge of the next clock pulse from programmable or variable clock 133, to commence and maintain current respectively to LEDs 30a, 30b, or 30c, etc. After the counter 130 counts down to zero, the counter 130 is either reset by the next clock pulse into a count-up mode or is inhibited from counting additional clock pulses for a minimum period $T_{MIN}$ that is programmed into the counter or provided by other suitable means. After this predetermined time period $T_{MIN}$, the counter is set to count in its count-up mode and commences counting clock pulses again. When the counter output in its count-up mode reaches decimal 10, the output of comparator 128a changes and the latch 132a is reset and current to the LED 30a ceases. The other LEDs 30b, 30c, etc. operate in similar fashion but their data will require different count values to turn on and off in accordance with grey scale data provided in their respective multi-bit registers. What these LEDs will, thus, have in common with LED 30a is that all will have their respective current pulses centered.

The current level to each LED driven by a particular driver chip is the same but the pulse duration for each LED during each line of print is varied. In this embodiment the LEDs may be initially "balanced" such as by adjusting a "trim" resistor 78a, 78b, associated with current mirrors for each driver chip, see for example U.S. Pat. No. 4,831,395. Other known techniques for balancing output of the recording elements may also be provided. See, for example, U.S. Pat. No. 4,885,597 in the names of Pin Tschang et al and U.S. Pat. No. 5,257,039 in the names of Jeremy Chung et al. In addition, further balancing or correction for unequal light output is provided as discussed above by adjustment of the data in accordance with the characteristics of each LED. Memory device 16 such as a programmable mad-only memory device or PROM may store the characteristics of each LED and data for that LED can be modified to provide an input count at terminal B that represents data modified by the exposure characteristics of the LED. Thus, for an LED that is a relatively strong light emitter the PROM 16 modifies gray level data bits for that LED to reduce the count that otherwise would be provided at terminal B based solely on the data.

As noted from above, for this example, the allowed exposure times number 63 which is $2^6-$. Thus, only 6 data lines are required to go to the printhead to provide possible exposure enabling times for the LEDs that extends over a relatively long duration yet provides for fine approximations for correction in those areas of lightness space where it is needed.

In U.S. Pat. No. 5,200,765, description is provided as to one method and apparatus for generating the exposure clock signals for creating these 63 exposure times which are nonlinearly related. Required exposure times may vary, for the particular printhead from say 6 microseconds to about 80 microseconds. Recall also that the technique employed for creating a single pulse width exposure period is to provide a minimum on time $T_{MIN}$ for the shortest duration pulse used which can be considered the pulse for driving the very brightest LED for the minimum time necessary to record gray level No. 1. Still other programmable clocks may be used such as that described in commonly assigned U.S. application Ser. No. 07/807,522.

In the discussion provided above, it was noted that the data source 21 provided data information having 4 bits per pixel while the data passed along to data bus $D_0-D_5$ was 6 bits per pixel. As may be noted in FIG. 3, the data sources 19 output is input to the lookup table memory device 16 along with an address provided by an address generator 25. The address generator points to the location in memory device 16 thereof where data is stored for each particular LED. Thus, a table of memory is provided for each LED and indicates for this LED a corresponding exposure time for each grey level it is to print. It is this exposure time which is a six-bit digital number that is output as data onto data bus $D_0-D_5$. Obviously, examples of 4 and 6-bits are exemplary and other bit depths may be used.

To automatically calculate the exposure times, the integrated circuit driver chips 40 receive appropriate signals for use in generating test exposure timing signals for controlling the on-time for each LED. The Selfoc lens or gradient index lens focuses light from the LEDs onto a photosensor, PS, placed at the focal plane of the lens. A motor is coupled to a mirror and/or photosensor to step same from LED to LED. The output of the photosensor is an analog signal and is input to an analog to digital converter (A/D) for input to a logic and control unit 15 (LCU) over appropriate lines. The LCU controls the stepping of motor, M, photosensor PS, and/or mirror and includes a microcomputer programmed for calculating the 63 exposure times. A program for calculation of exposure times is in accordance with an algorithm such as that described in U.S. Pat. No. 5,200,765 or in the aforementioned U.S. application Ser. No. 08/175,079 or other suitable algorithm.

The calibration process may take place in the factory where the printhead is manufactured and/or while assembled on the machine. It may also take place from time to time where the printer is located during periods of job production inactivity. The use of an automatic calibrator as described herein on the printhead may obviate the need to correct data because of age and temperature considerations as indicated by device 16a. Such consideration may be corrected instead by adjusting current level to the LEDs.

Figure 4:
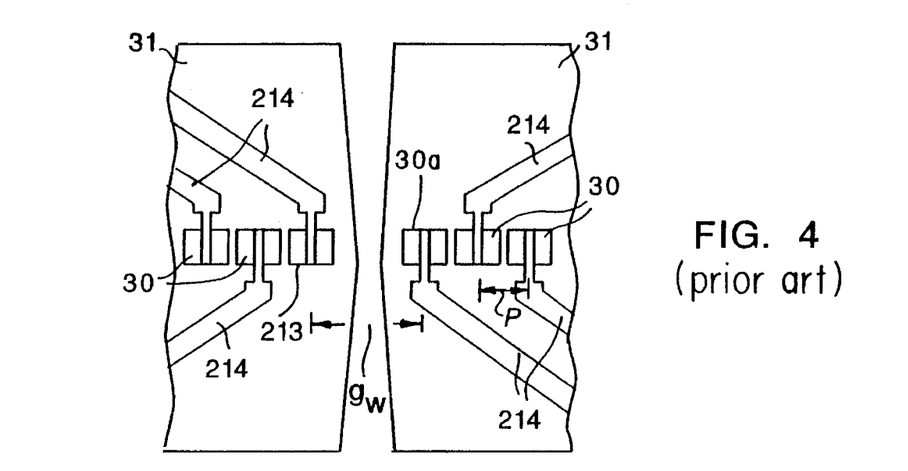
FIG. 4 is an enlarged view of a portion of a portion of the printhead of FIG. 2 illustrating adjacent end-butting LEDs.

With reference to FIG. 4, there is shown portions of two adjacent LED arrays 31 greatly enlarged. As shown LEDs 30 and end-butting LEDs 30a each have conductive electrodes 214 that are connected to the driver chips for carrying current to the LEDs. Typically, when assembled on the printhead in proximate butting relationship, the assembly process attempts to maintain for adjacent end-butting LEDs the nominal pitch spacing "p" that is between LEDs 30 on the same array. As used herein, the term pitch refers to a spacing between corresponding pans of adjacent recording elements or LEDs on the same array. In an example where the LED printhead attempts to maintain a uniform spacing or pitch of say 400 dots per inch between LEDs, the pitch spacing will be 63.5 microns.

In a typical LED printhead that uses LED arrays to form a single line of image pixels, there is always a butting gap spacing between LED arrays. If the mechanical placement of the two adjacent arrays are not exactly accurate, there is a butting gap position error between end LEDs 30a on the two adjacent arrays. This problem can cause a one-dimensional density streak on the printed image due to the end pixels butting error in an otherwise high quality printing. There is thus placed great demands on the butting accuracy of LED arrays for the printhead manufacturer. It is desirable to be able to correct for this spatial error in placement accuracy and relax the butting error requirement so quality can increase and printhead price can decrease.

The invention proposes that the effect of butting gap placement error be corrected through an adjustment of exposure of the end LEDs to correct for spatial placement errors. Generally, the invention realizes that due to overlap of exposed pixels and based on different amounts of the butting error, one can change the exposure of the butting end pixels to compensate for the error in printing using grey level printing methods. The result is a more uniform print. One can also make use of more than the end LEDs to comet for this problem.

In performing the method of the invention, one first needs the radiometric data for the LEDs and the spatial separation of the end LEDs of adjacent arrays in a printhead. Once the brightness of the LEDs and butt gap errors are known, one can modify the apparent brightness of the end LEDs before the nonuniformity correction method is applied to all pixels in a printhead. In this example, there is only changed the apparent brightness of the end pixels of adjacent arrays on the printhead (not LEDs further away from the end LEDs yet). For a larger than normal LED separation between end LED (in this case 63.5 microns) the apparent brightness of the two end LEDs is lowered So when the uniformity correction algorithm is used to calculate exposure time for these LEDs a longer exposure time (more exposure) for these pixels will occur than normal. The net effect is to compensate for a larger than normal separation between the two end LEDs. For a smaller separation between end LEDs, the method of the invention increases the apparent brightness of the two end LEDs so a shorter exposure time than normal is obtained by running a uniformity correction algorithm.

A typical equation to modify LED brightness for a 400 dpi printhead is as follows:

New LED brightness or intensity for end LEDs (NB)=Old LED brightness for end LEDs (OB) * [1-[gap width -63.5 microns]* 0.0125]

Similarly for a 600 dpi printhead with 42.3 microns nominal pitch spacing, the equation becomes OB * [1[gap width -42.3 microns]α*]. For other printheads, a similar equation can be used.

Where gap width or pitch distance, $g_w$, is measured in microns.

Although the above equation assumes the modification for the gap width error by exposure is linear (both in the positive and negative direction) a more optimized solution may take on other correction curve shapes such as non-linear curves. Also, it should be understood that the correction parameter α may depend on the toner particle size used, micro-contrast of the toner as well as the pixel shape of the exposure system. The result from this gives us a much more uniform printed image. In the example of the 400 dpi printhead, the toner particle size assumed is 9 ½ microns, wherein an emitter size is 45 microns in the direction of the row of LEDs, an SLA-12 Selfoc lens images the LEDs. It will be noted that the value of α=0.0125 for the 400 dpi printhead provides 5% correction for every 4 microns of error in spacing.

In considering gap width, the center of the LED may be defined as the optical power centroid of the LED and not necessarily the physical center of the emitter based on physical markers like the metal finger electrodes shown in FIG. 4.

Further extensions of this method can be applied to the flare correction (like reflection from wire bonds), pixel size variation across the length of the printhead and other optical effects in an LED printhead or other exposure system that may also have butting error or pixel size variations.

Figure 5:
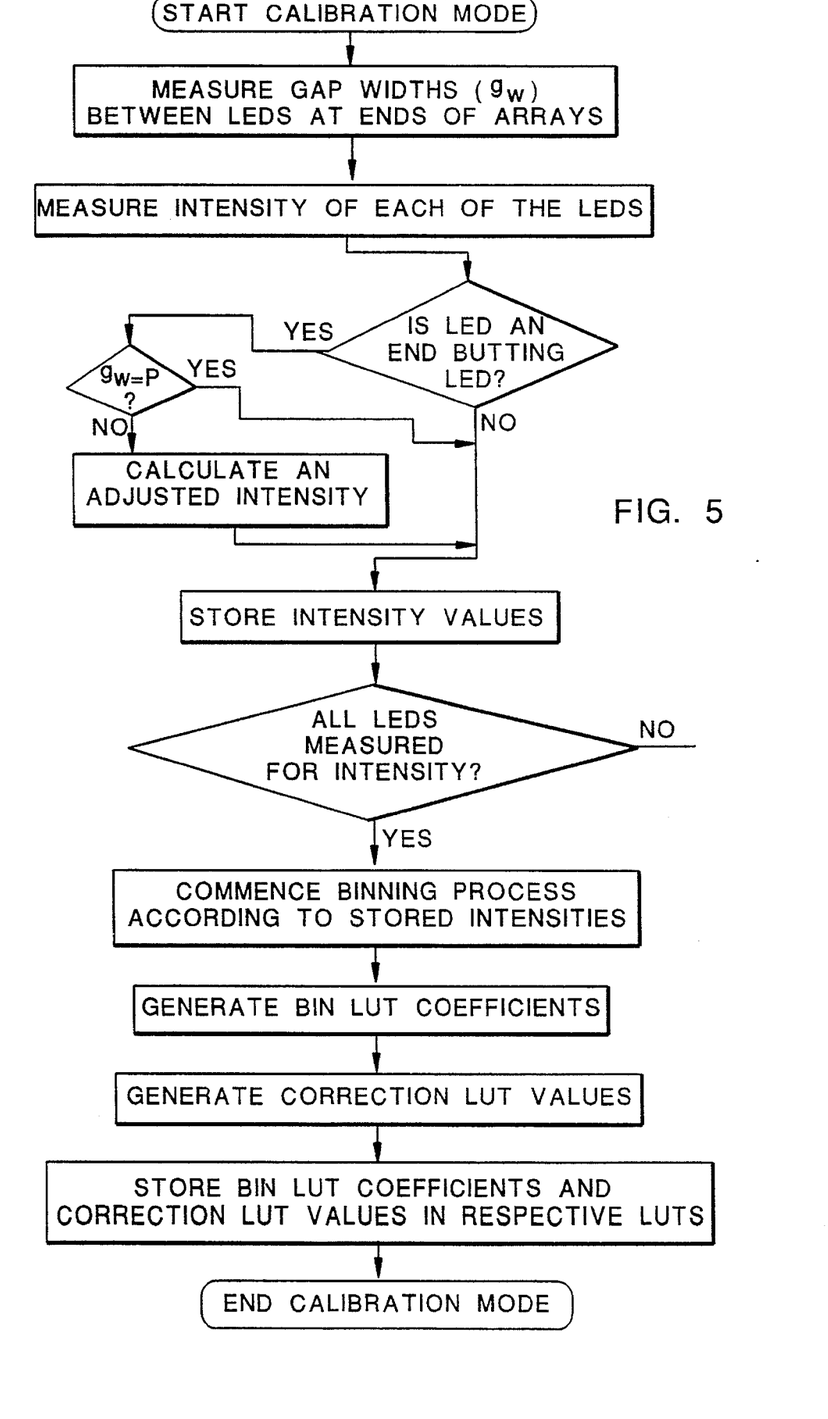
FIG. 5 is an algorithm used in accordance with the method of the invention for calibrating an LED printhead.
Figure 6:
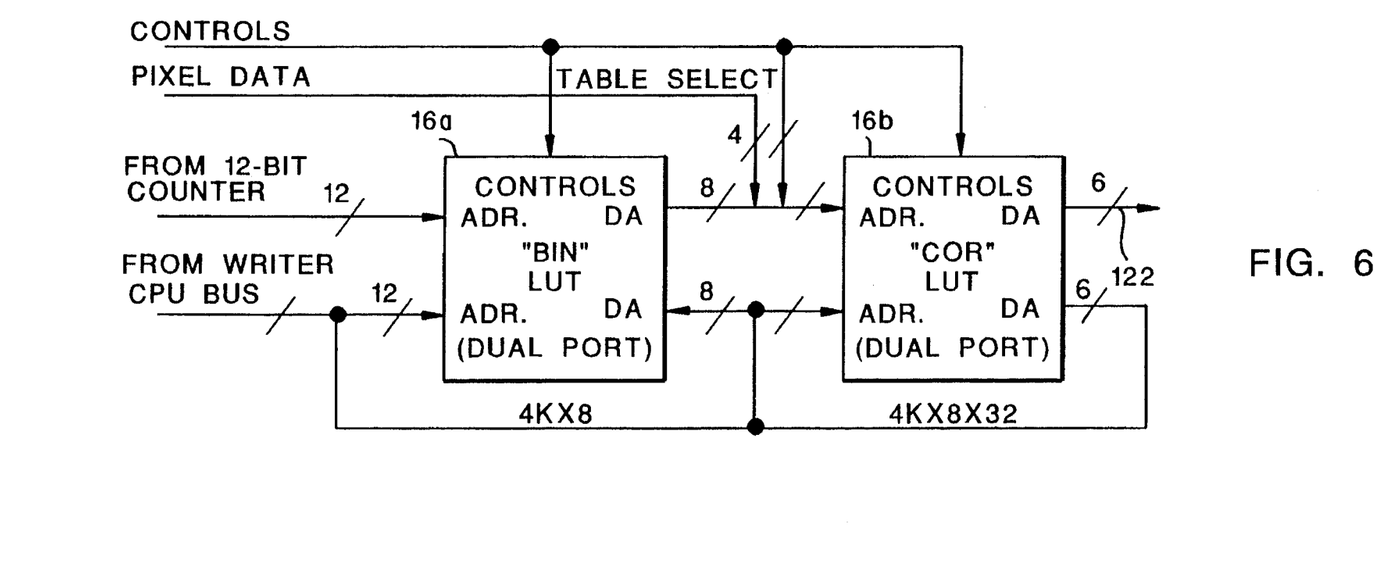
FIG. 6 is a schematic of a pair of table memories that are used to provide corrected image data for use in controlling recording periods for the LED printhead of FIG. 2.

Reference will now be made to the flowchart of FIG. 5. In accordance with this flowchart, the intensity of each of the LEDs is measured one by one. For those LEDs defined as end-butting LEDs, e.g., for example LEDs 2 in FIG. 4 the gap width or end pitch interspacing $g_w$ is measured. For those LEDs that are not end-butting LEDs the actual measured intensity is stored in memory. The actual measured intensity of LEDs that are end-butting LEDs and whose gap widths equal the LED nominal pitch spacing are also stored. However, for those LEDs that are end-butting LEDs but whose gap width is other than nominal their respective measured intensities are adjusted in accordance with the equation provided above and the calculated adjusted intensity is stored in memory of the stored LED intensity values. From the stored intensity values the LEDs may be assigned or binned into say 256 bins wherein in each bin the LEDs have generated approximately similar intensity values. Various algorithms such as described above or in the prior art may be provided for this binning process. From the binned values, correction coefficients or correction factors for storage in the bin LUT 16a (FIG. 6) are generated. Similarly, using the stored intensity values, values for a correction LUT 16b are also generated using algorithms known in the prior art which algorithms are not essential to this invention. With reference now to FIG. 6, each of the LUTs 16a and 16b are dual ported memories. Bin LUT 16a and LUT 16b each have two 12-bit address inputs. One input for LUT memory 16a allows identification of an address input for storing an 8-bit coefficient value for an LED identified by the 12-bit address input on the writer PCU bus. A second address input line is provided form a 12-bit such as an address generator 25 that is used to address the LUT 16a to identify a particular LED. This address of the LED identifies the bin in which the LED has been assigned and the stored exposure coefficient for the LEDs in that bin. An 8-bit coefficient value is then output from LUT 16a to a first address input of correction LUT memory LUT memory 16b. During calibration the correction LUT has been loaded at its second address input with correction data that is used to provide a 6-bit output signal representing exposure duration in response to both a 4-bit pixel data signal, representing the grey level of the pixel to be recorded by the particular LED identified by the address generator 25, and the 8-bit exposure coefficient signal output by bin LUT 16a.

Thus, it has been shown that by adjustment of an exposure parameter for end-butting recording elements based on gap spacing errors that improved image quality can be obtained.

The invention has been described in detail with particular reference to preferred embodiments thereof and illustrative examples, but it will be understood that variations and modifications can be effected within the spirit and scope of the invention.

We claim:

1. A method for producing a memory having data representing correction factors stored therein, the memory forming part of a printer, the printer having a printhead that includes a plurality of light-emitting recording elements arranged in a row in a series of arrays wherein each array includes a plurality of recording elements generally uniformly spaced a nominal pitch distance on the array in the direction of the row, the arrays having respective array end recording elements in which the array end recording elements of at least some of the arrays have spacings from adjacent array end recording elements on adjacent arrays that are different than the nominal pitch distance, the method comprising the steps of:

(a) measuring a parametric output associated with light-emissions from each recording element;

(b) assigning correction factors to the recording elements to correct for non-uniformity of light emissions therefrom with recording elements having generally similar measured parametric outputs being assigned identical correction factors;

(c) assigning correction factors to array end recording elements, that are spaced other than the nominal pitch distance, in accordance with parameters relating to their spacing from a respective adjacent array end recording element and their measured parametric outputs; and (d) storing the correction factors in Steps (b) and (C) in a memory associated with the printhead.

2. The method of claim 1 wherein the correction factors are stored in a look-up table memory.

3. The method of claim 2 wherein the correction factors are output from the look-up table memory and input to a second look-up table memory that outputs a corrected image signal related to pulse duration in response to a correction factor input and a multibit pixel data input to said second memory.

4. The method of claim 1 wherein the parametric output is brightness.

5. The method of claim 4 including adjusting a measured brightness of an array end recording element in accordance with a factor related to a spacing with an adjacent array end recording element.

6. The method of claim 5 wherein the adjusting of measured brightness for a 400 dpi printhead is in accordance with the equation $$NB=OB* [1-[g_w-63.5]* 0.0125]$$

wherein NB is a new or adjusted brightness, OB is measured brightness, and $g_w$ is pitch distance between adjacent array end recording elements measured in microns.

7. The method of claim 5 wherein the adjusting of measured brightness for a 600 dpi printhead is in accordance with the equation $$NB=OB* [1[g_w-42.3]* 0.01251]$$

wherein NB is a new or adjusted brightness, OB is measured brightness, and $g_w$ is pitch distance between adjacent array end recording elements measured in microns.

8. A readable memory storage device having data representing correction factors stored therein for correcting light emissions from a printhead, the storage device being adapted for use with a printer having a printhead that includes a plurality of light-emitting recording elements arranged in a row in a series of arrays wherein each array includes a plurality of recording elements generally uniformly spaced a nominal pitch distance on the array in the direction of the row, the arrays having respective array end recording elements in which the array end recording elements of at least some of the arrays have spacings from adjacent array end recording elements on adjacent arrays that am different than the nominal pitch distance, the data in the storage device comprising:

(a) first correction factors, for recording elements that arc not array end recording elements, to correct for non-uniformity of light emissions therefrom with recording elements having generally similar measured parametric outputs being assigned identical correction factors; and (b) second correction factors, for array end recording elements that are spaced other than the nominal pitch distance, the second correction factors being in accordance with parameters relating to their spacing from respective adjacent array end recording elements and their respective measured parametric outputs.

9. A printer comprising:

a printhead that includes a plurality of light-emitting recording elements arranged in a row in a series of arrays wherein each array includes a plurality of recording elements generally uniformly spaced a nominal pitch distance on the array in the direction of the row, the arrays having respective array end recording elements in which the array end recording elements of at least some of the arrays have spacings from adjacent array end recording elements on adjacent arrays that are different than the nominal pitch distance;

a readable memory storage device having data representing correction factors stored therein for correcting light emissions from the printhead, the data in the storage device including:

(a) first correction factors, for recording elements that are not array end recording elements, to correct for non-uniformity of light emissions therefrom with recording elements having generally similar measured parametric outputs being assigned identical correction factors; and (b) second correction factors, for array end recording elements that are spaced other than the nominal pitch distance, the second correction factors being in accordance with parameters relating to their spacing from respective adjacent array end recording elements and their respective measured parametric outputs; and means responsive to correction factors in the memory for controlling light-emissions from each recording element.

* * * * *